United States Patent
Davies

(10) Patent No.: US 11,719,339 B2
(45) Date of Patent: Aug. 8, 2023

(54) LOW DRAG TORQUE LIMITER FOR ELECTRIC TRAS

(71) Applicant: Goodrich Actuation Systems Limited, Solihull (GB)

(72) Inventor: Stephen H. Davies, Shrewsbury (GB)

(73) Assignee: GOODRICH ACTUATION SYSTEMS LIMITED, West Midlands (GB)

(*) Notice: Subject to any disclaimer, the term of this patent is extended or adjusted under 35 U.S.C. 154(b) by 249 days.

(21) Appl. No.: 16/713,061

(22) Filed: Dec. 13, 2019

(65) Prior Publication Data
US 2021/0054928 A1    Feb. 25, 2021

(30) Foreign Application Priority Data

Aug. 19, 2019  (EP) .................................... 19192414

(51) Int. Cl.
| | |
|---|---|
| *F16H 63/36* | (2006.01) |
| *H02K 7/00* | (2006.01) |
| *H02K 7/08* | (2006.01) |
| *H02K 7/116* | (2006.01) |
| *H02K 7/12* | (2006.01) |

(52) U.S. Cl.
CPC .............. *F16H 63/36* (2013.01); *H02K 7/003* (2013.01); *H02K 7/08* (2013.01); *H02K 7/116* (2013.01); *H02K 7/12* (2013.01)

(58) Field of Classification Search
CPC .......... F16H 63/36; H02K 7/003; H02K 7/08; H02K 7/116; H02K 7/12; Y02T 50/40; F16D 3/72; F16D 41/06; F16D 43/02; B64C 13/50
See application file for complete search history.

(56) References Cited

U.S. PATENT DOCUMENTS

| | | |
|---|---|---|
| 6,810,656 B2 | 11/2004 | Kortum et al. |
| 9,010,204 B2 | 4/2015 | Moradell-Casellas |
| 9,534,584 B2 | 1/2017 | Ossyra |

(Continued)

FOREIGN PATENT DOCUMENTS

| | | |
|---|---|---|
| EP | 2947342 A1 | 11/2015 |
| EP | 3222869 A1 | 9/2017 |

(Continued)

OTHER PUBLICATIONS

Extended European Search Report for International Application No. 19192414.1 dated Dec. 16, 2019, 6 pages.

(Continued)

*Primary Examiner* — Tulsidas C Patel
*Assistant Examiner* — Viswanathan Subramanian
(74) *Attorney, Agent, or Firm* — Cantor Colburn LLP

(57) ABSTRACT

An actuation system is provided comprising an electric motor having a motor output shaft, a first actuator and a transmission system linking the electric motor to the first actuator. The transmission system comprises a drive shaft having an input end and an output end, the output end connected to an input of the first actuator, and a torque limiter. The torque limiter is positioned at an upstream end of the transmission system and connects the motor output shaft of the electric motor to an input end of the drive shaft.

12 Claims, 7 Drawing Sheets

(56) References Cited

U.S. PATENT DOCUMENTS

| | | | |
|---|---|---|---|
| 2004/0055850 A1* | 3/2004 | Howard | F16D 11/10 |
| | | | 192/85.18 |
| 2008/0185242 A1 | 8/2008 | Mayer et al. | |
| 2011/0072780 A1 | 3/2011 | Somerfield et al. | |
| 2015/0107220 A1 | 4/2015 | Chakkera et al. | |
| 2017/0204811 A1* | 7/2017 | Davies | F02K 1/72 |
| 2017/0276183 A1* | 9/2017 | Davies | F16D 3/72 |
| 2017/0292474 A1* | 10/2017 | Davies | F02K 1/72 |
| 2019/0061531 A1* | 2/2019 | Harrington | B60L 7/18 |
| 2019/0128343 A1* | 5/2019 | Davies | F16D 47/04 |

FOREIGN PATENT DOCUMENTS

| | | | | |
|---|---|---|---|---|
| EP | 3450305 A1 | | 3/2019 | |
| GB | 2043834 A | * | 10/1980 | F16D 3/72 |
| WO | 2004113707 A1 | | 12/2004 | |

OTHER PUBLICATIONS

EPO Official Letter for Application No. 19192414.1, dated Oct. 28, 2022, 5 pages.

\* cited by examiner

LOW DRAG TORQUE LIMITER FOR ELECTRIC TRAS

FOREIGN PRIORITY

This application claims priority to European Patent Application No. 19192414.1 filed Aug. 19, 2019, the entire contents of which is incorporated herein by reference.

FIELD

The present disclosure relates to an actuation system, for example, for a thrust reverser actuation system (TRAS), and to a method of limiting torque in such an actuation system.

BACKGROUND

Torque limiters are used in a wide variety of applications. One such application is in actuators used in aircraft, where the actuators may be used to deploy control surfaces, for example flaps or slats, or move components in a nacelle of a gas turbine engine, for example, a translating cowl in a TRAS. In an electrically driven variant of TRAS, power is usually transmitted to a plurality of linked actuators from a central power drive unit. Torque limiters are used with each actuator to limit the maximum torque delivered to the translating cowl in the event of a power failure or jam. Without a torque limiter, the entire output torque of the power drive unit would feed directly into the jammed component, requiring the relevant structure to be sized to withstand such loading. This would result in weight penalties on the aircraft, which is undesirable. Torque limiters therefore enable significant weight saving to the aircraft, which is highly desirable.

Some power drive units that incorporate electric motors have high accelerations and inertias. Electrically driven TRAS are one example where such electric motors may be employed.

SUMMARY

Viewed from a first aspect the present disclosure provides an actuation system comprising an electric motor having a motor output shaft, a first actuator and a transmission system linking the electric motor to the first actuator. The transmission system comprises a drive shaft having an input end and an output end, the output end connected to an input of the first actuator, and a torque limiter. The torque limiter is positioned at an upstream end of the transmission system and connects the motor output shaft of the electric motor to an input end of the drive shaft.

Optionally, the drive shaft may comprise a flexible drive shaft. Additionally or alternatively the output end of the drive shaft may connect to a gearhead at the input of the first actuator.

Optionally, the flexible drive shaft may comprise a series of apertures or slots to permit lateral flexion.

Optionally, the actuation system may comprise additional actuators that are linked to the first actuator by transmission shafts connecting the first actuator to the additional actuators to deliver torque to each of the additional actuators.

Optionally the additional actuators may be configured to be driven by the electric motor through flexible first and second transmission shafts connecting the first actuator to first and second gearheads respectively of the additional actuators.

Optionally the torque limiter may comprise an input shaft coupled to the electric motor, an output shaft, a torsion spring. The torsion spring may have a first end coupled to the input shaft and a second end coupled to the output shaft. The torsion spring may be torsionally preloaded. The torque limiter may further comprise a jammer coupled to the input shaft and the output shaft. The jammer may be configured to stop rotation of the input shaft and ground torque in response to relative rotation between the input shaft and the drive shaft.

Optionally, the ratio of a minimum torque limiter setting, determined by the torsion spring preload, and a torque required to drive the TRAS may be at least 11:10, optionally at least 6:5.

Optionally, the input shaft and the output shaft of the torque limiter may be concentrically coupled for torque transmission within the jammer. Optionally the input shaft of the torque limiter may have a portion that extends axially parallel to and radially inwards of a portion of the output shaft, the portion of the output shaft comprising a plurality of teeth separating a plurality of roller elements within the jammer.

Optionally, the torque limiter may further comprise coupling pins extending radially through openings in the input shaft and the output shaft, the coupling pins connected to the torsion spring. Optionally the openings may extend in a radial direction when viewed in lateral cross-section, the openings increasing in width in a circumferential direction as they extend in the radial direction.

Optionally, the input shaft of the torque limiter may be synchronous with the output shaft during normal use when operating levels of torque are below a torsional preload of the torque limiter.

Optionally, the electric motor output shaft may comprise a quill shaft.

Optionally, the electric motor outer shaft may comprise a shear neck.

Optionally, the actuation system may be a thrust reverser actuation system (TRAS) of an aircraft.

Viewed from a second aspect, the present disclosure may provide a method of limiting torque in an actuation system comprising: driving a first actuator using an electric motor; limiting a torque load from being transferred from the electric motor to the first actuator, using a torque limiter, during a failure event, wherein the torque load is limited by the torque limiter at a motor output shaft of the electric motor where torque is being coupled from the motor output shaft to an upstream end of a transmission system that is arranged to deliver torque to the first actuator.

Optionally, the torque load may be grounded by the torque limiter, during a failure event, into an airframe of an aircraft.

Optionally the method of limiting torque may be applied to a TRAS and the electric motor and first actuator are components of the TRAS.

Viewed from a further aspect, the present disclosure may provide a thrust reverser actuation system (TRAS) comprising an electric motor having a motor output shaft, a first actuator and a transmission system linking the electric motor to the first actuator, wherein the transmission system comprises a torque limiter comprising: an input shaft coupled to the electric motor; an output shaft; a torsion spring, wherein the torsion spring has a first end coupled to the input shaft and a second end coupled to the output shaft, and wherein the torsion spring is torsionally preloaded; and a jammer coupled to the input shaft and the output shaft, wherein the jammer is configured to stop rotation of the input shaft and ground torque in response to relative rotation between the input shaft and the drive shaft.

Optionally the TRAS of this aspect may comprise any of the previously recited optional features.

BRIEF DESCRIPTION OF THE FIGURES

Certain embodiments of the invention will now be described by way of example only and with reference to the accompanying drawings in which.

DESCRIPTION

Figure 1:
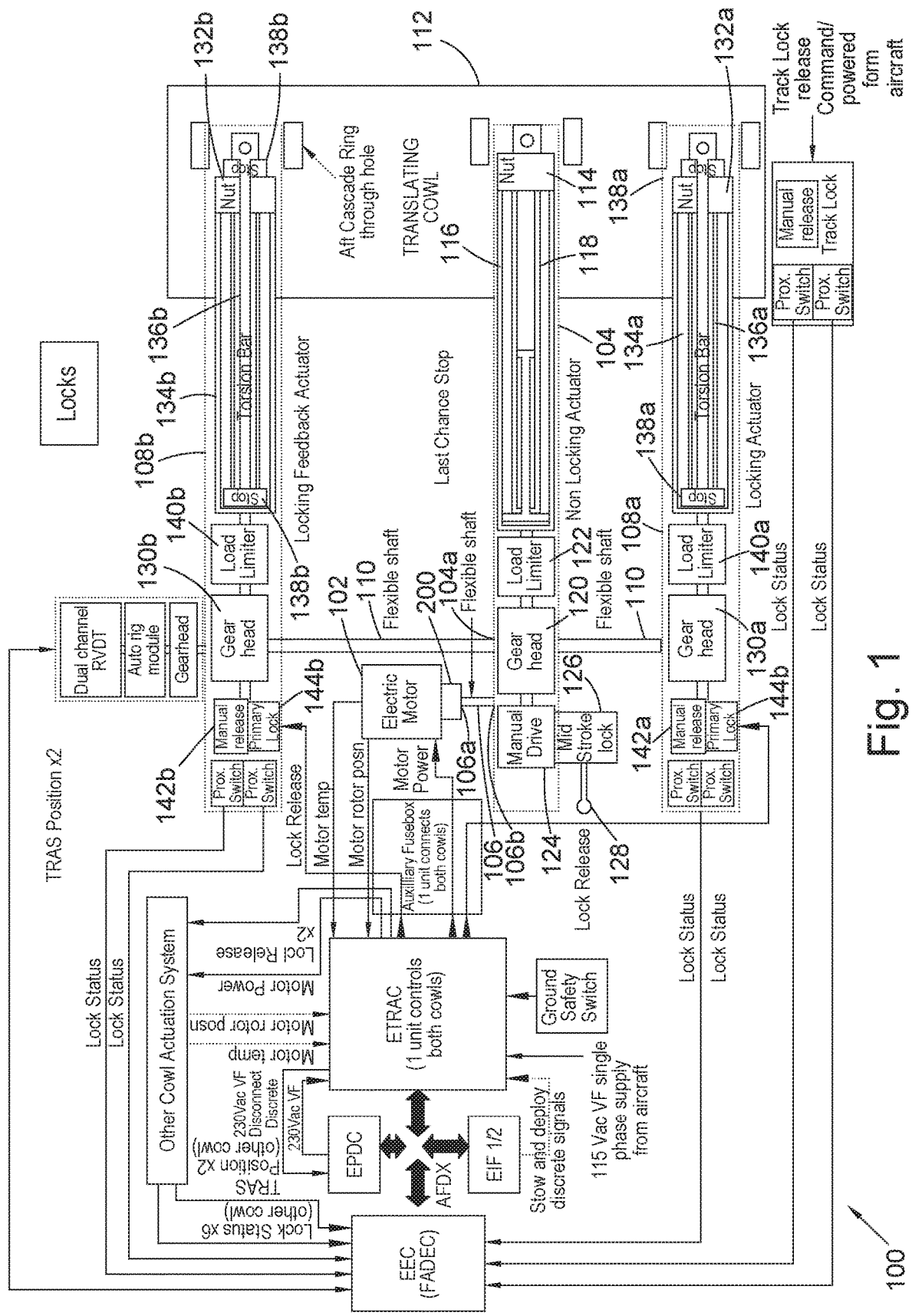
FIG. 1 illustrates an exemplary thrust reverser actuation system (TRAS)

As electric motors become more commonplace in actuation systems, design considerations are needed for the actuation systems that are powered by such electric motors. Electric motors for large actuation systems can generate high inertia due to the larger and heavier motors that may be necessary to drive the system. High amounts of inertia in an actuation system may govern the mechanical sizing of the system. For example, in the event of a jam of an actuated surface, the inertia of the motor will be reacted by the entire actuation system from the motor to the point of jam and the components must be structurally sized accordingly. If a loss of power during systems operation occurs, then higher torsional loads can be exerted as actuators reach the end of their stroke at full speed.

Electric motors are able to generate large amounts of torque. They are also able to accelerate quickly due to being essentially free of friction. For example, in gas turbine engines, electric motors may be used that are able to reach speeds in the order 800 rad/s (7,640 rpm) in 100 milliseconds.

Thrust reverser actuation systems (TRAS) employ electric motors which have such high accelerations. The motors are used to move a translating cowl of a TRAS on landing in order to open vents to redirect at least a portion of the gas turbine airflow in an opposite direction to that of the aircraft. Compliance to maximum operating times, particularly deployment time, can be prime requirements for a TRAS. Accordingly, any sources of drag within the motor, transmission system or actuators, should be minimised as far as possible.

A technical challenge is recognised in connection with existing TRAS, in which the translating cowl of the TRAS be deployed rapidly during landing. Moreover, in an electrically driven variant of TRAS, a drive train from the motor to the translating cowl may comprise a plurality of actuators, typically three actuators (though other numbers of actuators are possible), and for failure events, such as track jams, actuator jams and loss of power during system operation, the developed inertia must be accommodated by the design.

For example, in the event of loss of motor control, the inertia of the motor operating at full speed will be reacted by the actuation system at the end of its operating stroke and the components must be structurally sized accordingly. In addition if there is a jam in the track of the translating cowl or a jam in the actuator driving the translating cowl, then the inertia of the spinning motor exerts high levels of induced torque in the downstream actuators and drive/transmission shafts as the transmission system is brought to a halt.

Components downstream of the motor could be sized to withstand such events if damage to the components is to be avoided, but that increases the weight of the TRAS. Usually a torque limiter of some form will be included in the downstream actuators to ground excessive torque to the airframe. These tend to be integral with the individual actuators of a translating cowl, limiting damage caused to the actuators. However, following a failure event other components of the transmission system may need to be replaced, for example, the motor and the arrangement of flexible drive shafts and transmission shafts that deliver drive from the electric motor to a first actuator and then to other actuators coupled to the first actuator, as well as gears of gearheads and other downstream components that deliver torque to the actuators.

It has been noticed that torque loads experienced during a failure event, such as a loss of system power during operation or a jam of a track or actuator of a translating cowl in a TRAS, can be significantly higher than normal maximum operating torque loads. This has allowed for a modification that can protect the majority of the components in a TRAS from damage during such a failure event. The development also has application to other actuation systems.

In accordance with the present disclosure, in an actuation system comprising an electric motor and at least a first actuator, such as in a TRAS, a torque limiter is provided in a transmission system between a motor output shaft of the motor and an input end of a drive shaft, for example, a flexible drive shaft, that is connected at an output end to an input of the first actuator.

An advantage of this arrangement is that implementing a torque limiting function adjacent to the motor can, in most instances, protect all of the downstream transmission system, including shafts and gears, as well as the actuators, e.g., ballscrew actuators. Even with a relatively conservative high torsional preload, e.g., a preload set at 200% of maximum normal operating torque loads (which will prevent accidental actuation during operation within a wide working margin), the torque limiter can serve to reduce the maximum torque incurred in downstream components by over 80%. The torsional preload can, of course, be set even closer to the normal operating torque loads in order to maximise weight reduction benefits if the drag torque of the torque limiter is minimised.

Torque limiters are available in a variety of forms. A synchronous torque limiter, for example, is a torque limiter that is configured to maintain direct drive between the input and to output in all operating conditions. By contrast, a clutch type torque limiter is configured to slip in the event of a threshold torque being reached.

An advantage of a synchronous torque limiter is that a motor output shaft connected to an input side of a torque limiter would be synchronous with a drive shaft that is connected downstream to an actuator. This is particularly useful in systems like a TRAS where a position sensor may be integrated in the motor for determining the position of the actuator. If slipping was able to occur at any time, the true position of the actuator would become offset and the position sensor would need to be recalibrated.

Multi-plate friction plate arrangements for a torque limiter may also incur viscous drag which will limit the minimum setting that a torque limiter can be set at. Typically the viscous drag component of a multi-plate torque limiter will increase exponentially with reducing operation temperatures which is a further limitation since torque limiters for TRAS applications must be designed to operate at temperatures as low as −65 deg F. (−53° C.).

A synchronous torque limiter may also be of a disconnect type, meaning that the torque limiter is configured to uncouple the motor from the actuation system and connect directly to earth once a particular minimum torque threshold is exceeded. For example, the torque limiter may disconnect the motor from the actuation system by causing a mechanical component to shear in torsion. The mechanical component that is intended or configured to shear during such events may be termed a sacrificial component. The sacrificial component may be a shaft or coupling that is arranged to shear in a predetermined area. It may comprise, for example a shaft running through the motor or a shaft attached to it, such as a quill shaft, referred to collectively herein as the motor output shaft.

The torque limiter may comprise a torsional coupling to provide synchronous operation between an input shaft and an output shaft. For example, it may comprise first and second coupling pins which extend radially through openings in the input shaft and the output shaft. The edges of the openings, where they contact the coupling pins, may transfer torque from a shaft to the respective coupling pin. The coupling pins may be coupled together via a torsion spring, to transmit torque from an input side of the torque coupling to an output side during normal operation. The torsion spring may be torsionally preloaded, so that torque is coupled synchronously during normal operation and even for working loads up to a level of the preload. Torsional preload may be set by pretensioning the torsion spring, for example, the first and second ends of the torsion spring may be rotated in opposite directions from one another from the spring's rest position before they are connected to input and output sides of the torsional coupling via the coupling pins.

The preload of the torsion spring may be set at a level such that during normal operating conditions, the torque transmitted through the torsion spring does not exceed the preload. In effect, the preload sets a minimum torque limiter setting. In such circumstances, the input and output shafts will rotate together at the same speed, with the required torque being transmitted to the drive shaft and, therefore, to the input of the actuator. However, should, for example, an actuator or downstream component jam, then the output shaft of the torque limiter would cease to rotate, or at least rotate more slowly. If the torque settings are correct, this should result in the torsion spring preload being exceeded and the torque limiter grounding the torque into the surrounding structure, for example, through activation of a jammer.

A jammer may comprise a roller receiving surface, a plurality of roller elements, such as balls, spaced apart by projecting teeth, and a static ring disposed radially outwards of the roller receiving surface, the roller elements and the projecting teeth. The roller receiving surface may form part of the input shaft or the output shaft of the torque limiter, depending on the particular construction of the torque limiter. In the illustrated embodiment discussed below the roller receiving surface comprises a portion of the input shaft and the projecting teeth are provided by a portion of the output shaft. In this way, when the jammer is activated torque is directed outwardly towards a housing to ground the torque into a surrounding structure. The portion of the output shaft may extend to be radially outward of the portion of the input shaft, the surface of the input shaft not being in direct contact with the output shaft, and vice versa.

The roller receiving surface may comprise a plurality of receiving portions for receiving each of the plurality of roller elements, and a plurality of projecting portions positioned between each of the receiving portions, which project radially outward towards the static ring, such that ramps are formed either side of each of the projecting portions, the ramps sloping in a radially inward direction towards a minimum point on the receiving portion.

The plurality of roller elements may be positioned such that they are received by receiving portions on the roller receiving surface and may roll along the ramps towards the minimum point or rest at the minimum point when the input shaft and output shaft are not moving relative to one another. The roller elements may be made of steel or other suitable material and could be in the form of balls, pins or other appropriate roller element, positioned radially outward of the roller receiving surface and radially inward of a ring which is attached to or forms a part of the housing of the torque limiter. The roller elements may be sized so as to be not in contact with the static ring when positioned at or close to the minimum portion.

The housing of the torque limiter may be configured to be grounded to a static structure such that, if the jammer operates to stop rotation of the input and output shafts (i.e., it jams), the torque load from the electric motor is grounded through the housing and into the static structure. The static structure may be an airframe, aircraft wing, gas turbine engine or any other suitable structure of an aircraft or other vehicle or structure having actuators.

In the case where the output shaft extends over the input shaft, the projecting teeth may each be formed as a projection from an end of the output shaft towards an input end of the torque limiter. As mentioned above, the roller elements may be positioned between the projecting teeth. Thus, the projecting teeth extend through a portion of the torque limiter that is radially between the roller receiving surface and the static ring.

When the input shaft is rotating in concert with the output shaft, i.e., the input and output shafts are synchronous, the rolling receiving surface and the projecting teeth do not move relative to one another. If a jam or other event causes the output shaft to slow down or stop, for example, by generating a reaction torque, the input shaft continues to rotate and creates relative rotation in the jammer. That is, the rolling receiving surface will rotate relative to the projecting teeth. This relative rotation will cause the roller elements to travel ride up the ramps of the roller receiving surface, the roller elements being deflected outwardly in the radial direction to engage with the static ring. As the static ring does not move relative to either of the input shaft and the output shaft, the engagement of the roller elements with the static ring will prevent the roller receiving surface from continuing to rotate, and hence, the input shaft will be prevented from continuing to rotate. In this way, the torque from the motor is grounded into a housing of the torque limiter via the jammer, and thereby into the structure, e.g. airframe, that the torque limiter housing is anchored to.

The jammer has an advantage of preventing torque from being transferred into the entire downstream system in the event of a jam, loss of power, or any other event that causes relative rotation between the motor shaft and the actuator transmission shaft, and so damage to the downstream components is limited or prevented. Instead, the motor inertia may cause torsional shearing of the motor output shaft (e.g., a quill shaft fitted to the motor) that connects the motor to the torque limiter. Damage to such upstream components may be preferable to causing extensive and costly, both financially and temporally, damage to other components of the actuator system that lie downstream of the torque limiter.

A torque limiter of this type has benefits since it is generally immune to centrifugal effects, which can be an issue considering the extremely high motor accelerations that might be experienced. Torque limiters with ball ramp servo mechanisms as classically used in high lift torque limiters may be more susceptible to such effects.

As discussed, relative rotation between the input shaft and the output shaft may only occur if the preload on the torsion spring is overcome. The relative rotation may be small (of the order of a few degrees) and mechanically limited (e.g., through the mechanical interaction of the parts, such as the coupling pins engaging the sides of the holes in the input and output shafts). A jam in the actuator or a track, or loss of power during operation, may lock the rotation of the output shaft while the input shaft continues to experience torque. If the torque load on the input shaft exceeds the torsion preload on the torsion spring, the input shaft will try to continue to rotate relative to the jammed output shaft. In this event, a jammer may engage the housing as discussed above, grounding the torque from the motor.

In the case of a TRAS, the ratio of a minimum torque setting, determined by the torsion spring preload, and a torque required to drive the TRAS may be at least 11:10. It may be greater, for example, 6:5, 4:3, or more.

The electric motor may be used to drive one actuator in an actuation system. The electric motor may also be used to drive a plurality of actuators. The actuators may be linked in series or in parallel. When linked in series, the electric motor may be connected to a first actuator by a drive shaft and to an additional actuator by a transmission shaft receiving an output from the first actuator. In the case of a TRAS, two additional actuators may be provided, such that, when the electric motor drives the first actuator, the additional actuators are also driven, the additional actuators being driven in parallel by the outputs from the first actuator.

FIG. 1 illustrates an exemplary thrust reverser actuation system (TRAS) 100 for an aircraft.

The TRAS 100 comprises an electric motor 102, a first actuator 104 (a non-locking actuator) connected to the electric motor 102 by a drive shaft 106. The drive shaft 106 may be a flexible drive shaft, for example, comprising a series of apertures or slots to permit lateral flexion. The drive shaft 106 comprises an input end 106a and an output end 106b. The output end 106b is connected to an input 104a of the first actuator 104.

The first actuator 104 is coupled to two additional actuators 108a, 108b (two locking actuators, for example, a locking actuator 108a and a locking feedback actuator 108b) each connected to the first actuator 104 by a transmission shaft 110. The transmission shafts 110 may also be flexible shafts.

The TRAS 100 also comprises a translating cowl 112 connected to the first actuator 104 and the additional actuators 108a, 108b. The translating cowl 112 is arranged to be moved along tracks (not shown) by the actuators 104, 108a, 108b within the nacelle of a gas turbine engine.

The TRAS 100 is configured such that, when the electric motor 102 is in operation, the electric motor 102 drives the first actuator 104 and the additional actuators 108a, 108b synchronously through the drive shaft 106 and the connecting transmission shafts 110, moving the translating cowl 112 from its normal flight position to a thrust reversal position on landing. This opens vents to allow thrust gases from the gas turbine engine to be redirected and expelled through the open vents in a direction opposite to the direction of travel of the aircraft.

The first actuator 104 may comprise a nut 114 which is attached to the translating cowl 112. The nut 114 is movable along a track 116 of the first actuator 104, for example, through rotation of a bar 118 comprising a screw thread. The first actuator 104 may be a ballscrew actuator.

The first actuator 104 may also comprise a gearhead 120 at the input 104a to receive rotational drive from the output end 106b of the drive shaft 106. The gearhead 120 may transmit torque to the bar 118 via a load limiter 122 within the first actuator 104.

The first actuator 104 may further comprise a manual drive 124, a mid-stroke lock 126 and a lock release 128 which are coupled to the gearhead 120.

The additional actuators 108a, 108b may be arranged either side of the first actuator 104 in the TRAS 100. The transmission shafts 110 may be arranged to receive outputs from the gearhead 120 of the first actuator 104, the transmission shafts 110 delivering torque to the respective gearheads 130a, 130b of the additional actuators 108a, 108b.

The additional actuators 108a, 108b also comprise nuts 132a, 132b which are attached to the translating cowl 112. The nuts 132a, 132b are moved along tracks 134a, 134b by torsion bars 136a, 136b. The additional actuators 108a, 108b comprise stops 138a, 138b arranged to limit the stroke of the nuts 132a, 132b. The additional actuators 108a, 108b may be ballscrew actuators.

The additional actuators 108a, 108b may comprise internal load limiters 140a, 140b arranged to limit torsional load between the gearheads 130a, 130b and the torsion bars 136a, 136b.

The additional actuators 108a, 108b may also be provided with manual releases 142a, 142b and primary locks 144a, 144b, in a similar fashion to the first actuator 104.

Figure 2:
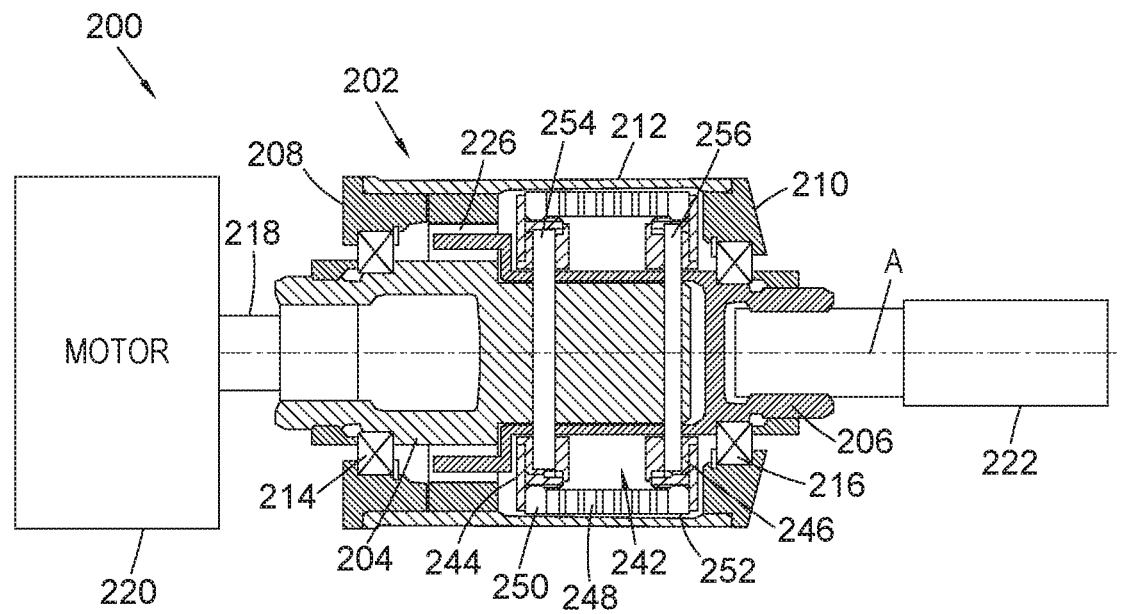
FIG. 2 is an axial cross-sectional elevation through an exemplary torque limiter.

FIG. 2 illustrates a torque limiter 200 which can be used in an actuation system, for example the actuation system of the TRAS 100 illustrated in FIG. 1.

The torque limiter 200 in FIG. 2 comprises a housing unit 202, an input shaft 204, and an output shaft 206. The housing unit 202 comprises first and second housing parts 208, 210 joined together by a joining part 212. The first housing part 208 supports the input shaft 204 through a first bearing 214. The second housing part 210 supports the output shaft 206 through a second bearing 216. The first and second bearings 214, 216 may be circumferential bearings, permitting rotation of the input shaft 204 and the output shaft 206 relative to the respective first and second housing parts 208, 210.

The input shaft 204 and the output shaft 206 extend parallel to a longitudinal axis A of the torque limiter 200, the longitudinal axis A extending through the centres of the input shaft 204 and the output shaft 206. Radial and circumferential directions are defined relative to this longitudinal axis A unless stated otherwise.

The housing unit 202 is grounded by anchoring the housing 202 to a static structure, for example, by bolts or other fasteners known in the art, e.g., to an airframe.

The input shaft 204 is coupled to a motor output shaft 218 of an electric motor 220. The output shaft 206 is coupled to a drive shaft 222 leading to an actuator or series of actuators.

Figure 4:
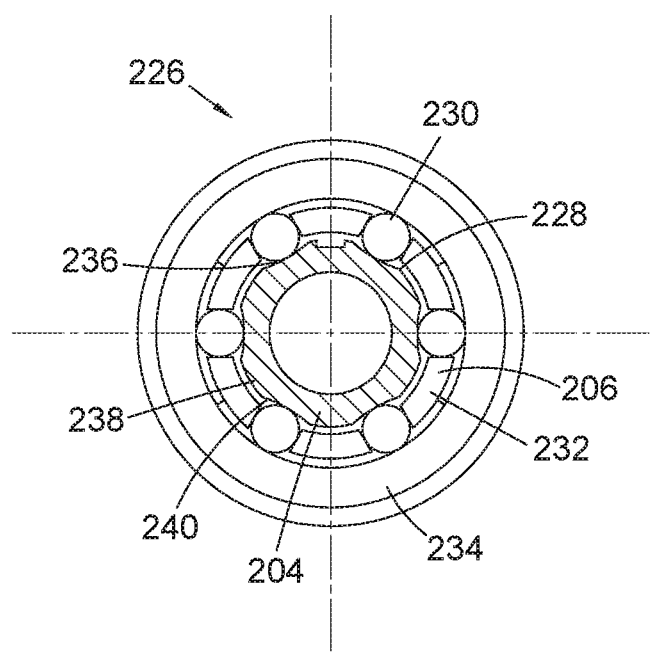
FIG. 4 is a transverse cross-sectional view through a jammer of an exemplary torque limiter.

The torque limiter 200 of FIG. 2 also comprises a jammer 226, shown in more detail in FIG. 4. The jammer 226 includes a roller receiving surface 228, a plurality of roller elements 230, for example, balls, spaced apart by projecting teeth 232, and a static ring 234, the static ring 234 being disposed radially outwards of the roller receiving surface 228, the roller elements 230, and the projecting teeth 232. The roller receiving surface 230 is formed on an outer surface of the input shaft 204. The output shaft 206 extends radially outward of the input shaft 204 and over the outer surface of the input shaft 204 but is not in direct contact with the input shaft 204.

The roller receiving surface 228 comprises a plurality of receiving portions 236, in the form of recesses, for receiving each of the plurality of roller elements 230, and a plurality of projecting portions 238 positioned between each of the receiving portions 236 which project radially outward towards the static ring 234, such that ramps 240 are formed either side of each of the projecting portions 238. The ramps 240, from the projecting portions 238, slope in a radially inward direction towards a minimum point on the receiving portion 236 where the radius is at a minimum. The radial distance between the minimum point and an inner circumferential surface of the static ring 234 may be approximately equal to the diameter of the roller elements 230 (with, for example, room for an oil film) to allow the roller elements to roll over the inner circumferential surface of the static ring 234 freely.

The plurality of roller elements 230 are positioned such that they are accommodated by the receiving portions 236 on the roller receiving surface 228 and may roll along the ramps 240 towards the minimum point when the input shaft 204 and output shaft 206 are stationary or rotating synchronously with respect to each other, i.e., when the torque is below the preset torsional load of the torque limiter and the input shaft 204 and the output shaft 206 are not moving relative to one another.

The roller elements 230 may be balls, pins or other appropriate roller element 230 positioned radially outward of the roller receiving surface 228 and radially inward of the static ring 234. The roller elements may be made of steel or other suitable material. The static ring 234 may be attached to or may form part of the housing unit 202 of the torque limiter 200. The roller elements 230 may not be in contact with the static ring 234 when positioned at or close to the minimum point.

The projecting teeth 232 are each formed as a projection from an end of the output shaft 206 towards an input end of the torque limiter 200 such that they extend into the jammer 226. As mentioned above, the roller elements 230 are positioned between the projecting teeth 232. Thus, the projecting teeth 232 of the output shaft 206 extend into a region that is radially between the roller receiving surface 228 and the static ring 234, and each of the projecting teeth 232 abut or are adjacent a roller element 230 in a circumferential direction.

Figure 3:
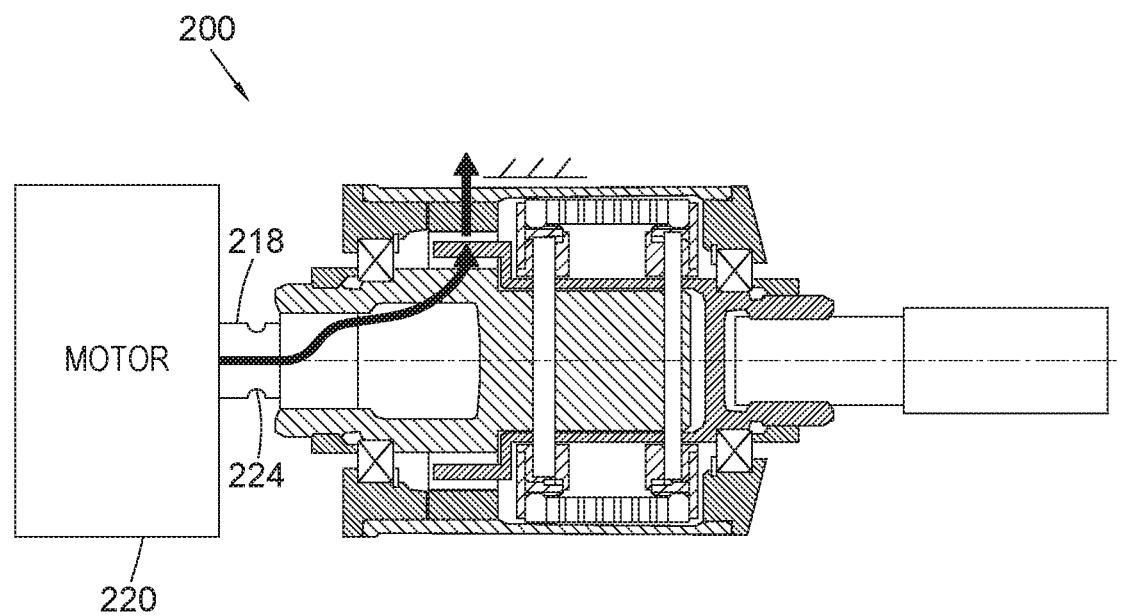
FIG. 3 is an axial cross-sectional elevation through a second exemplary torque limiter.

The output shaft 206 in this embodiment has a waisted central region 242. First and second ends 244, 246 of the torsion spring 248 may be formed as flanges arranged around ends of the waisted central region 242, as shown in FIGS. 2 and 3. This arrangement saves weight, but other configurations can also be envisaged.

Arranged around the output shaft 206 is mounted a torsion spring 248. The torsion spring 248 may be a machined spring. The torsion spring 248 may be made from titanium or titanium alloy, although other materials may be used. The material of the torsion spring 248 is chosen to provide suitable strength, torsional compliance and corrosion resistance for the conditions.

Both ends 250, 252 of the torsion spring 248 may be formed with openings for receiving the ends of a first coupling pin 254 and a second coupling pin 256. At least one of the first end 250 and/or the second end 252 of the torsion spring 248 may be provided with a series of openings, to allow for adjustment of a preset torsional load within the torsion spring 248.

Figure 5:
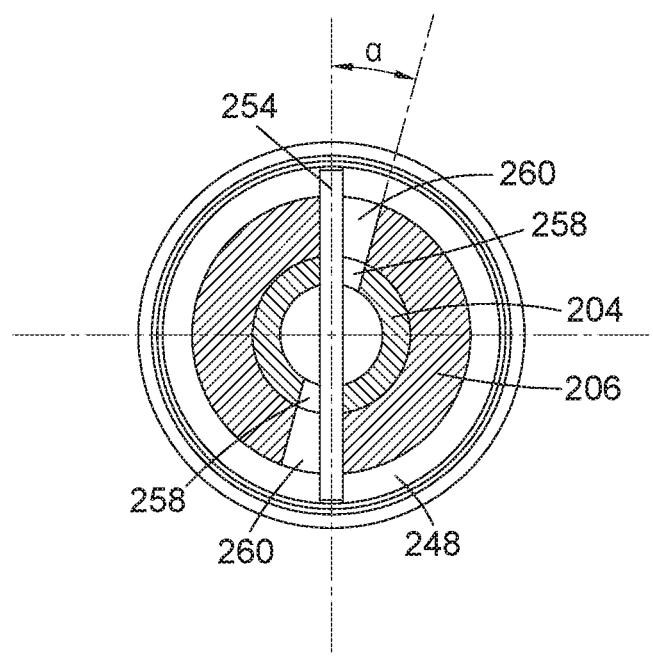
FIG. 5 is a transverse cross-sectional view through a torsional coupling of an exemplary torque limiter, showing a first coupling pin.
Figure 6:
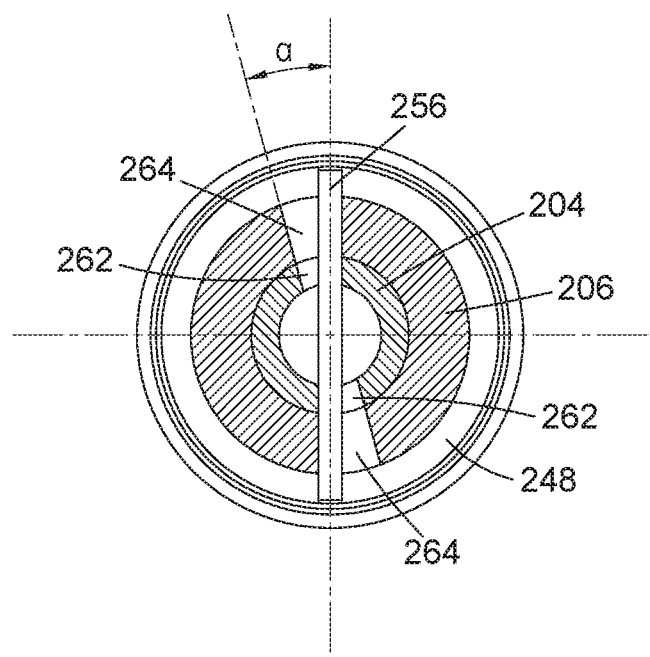
FIG. 6 is a transverse cross-sectional view through a torsional coupling of an exemplary torque limiter, showing a second coupling pin.

As illustrated in FIGS. 5 and 6, the first coupling pin 254 extends in a radial direction through the longitudinal axis A, through first and second diametrically opposed openings 258 in the input shaft 204, and through first and second diametrically opposed openings 260 in the output shaft 206. That is, there are two openings in each shaft radially opposed to one another, each opening extending radially through the shaft, and the first coupling pin 254 extending through all of the openings and beyond the radial extent of the output shaft 206. The second coupling pin 256 extends through the longitudinal axis A, through first and second diametrically opposed openings 262 in the input shaft 204, and through first and second diametrically opposed openings 264 in the output shaft 206. The two sets of openings are spaced apart axially in the central waisted region 242 of the output shaft 206 to define the axial extent of the torsional coupling.

Each of the openings is circumferentially larger than the coupling pin it receives, and has an angular extent $\alpha$. This allows limited relative rotational movement between the input shaft 204 and the output shaft 206, as will be described further below. The angle $\alpha$ may be less than 20°, for example, less than 15°. The angle $\alpha$ may be more than 5° and optionally more than 10°.

The torsion spring 248 is torsionally preloaded. That is, the first and second ends 250, 252 of the torsion spring 248 are rotated in opposite directions from one another from the torsion spring's rest position before the first and second coupling pins 254, 256 are inserted through their respective diametrically opposed openings. The required degree of preload is achieved by engaging the second coupling pin 256 in the openings at the second end 252 of the torsion spring 248 and the first coupling pin 254 in the desired pair of opposed openings in the first end 250 of the torsion spring 248. The effect of this is to bias the coupling pins 254, 256 into contact with the walls of the openings in the input and output shafts 204, 206, as shown in FIGS. 5 and 6. The first coupling pin 254 is biased into contact with clockwise facing surfaces (in the sense of FIG. 5) of the first openings 258, 260. However, the second coupling pin 256 is biased into contact with the anticlockwise facing surfaces (in the sense of FIG. 6) of the second openings 262, 264. That is, when the torsion spring 248 is in its rest position, the first and second coupling pins 254, 256 may be substantially parallel and the first and second openings are aligned such that the first set of openings have an angular extent $\alpha$ in the clockwise direction and the second set of openings have an angular extent $\alpha$ in the anticlockwise direction.

Figure 7A:
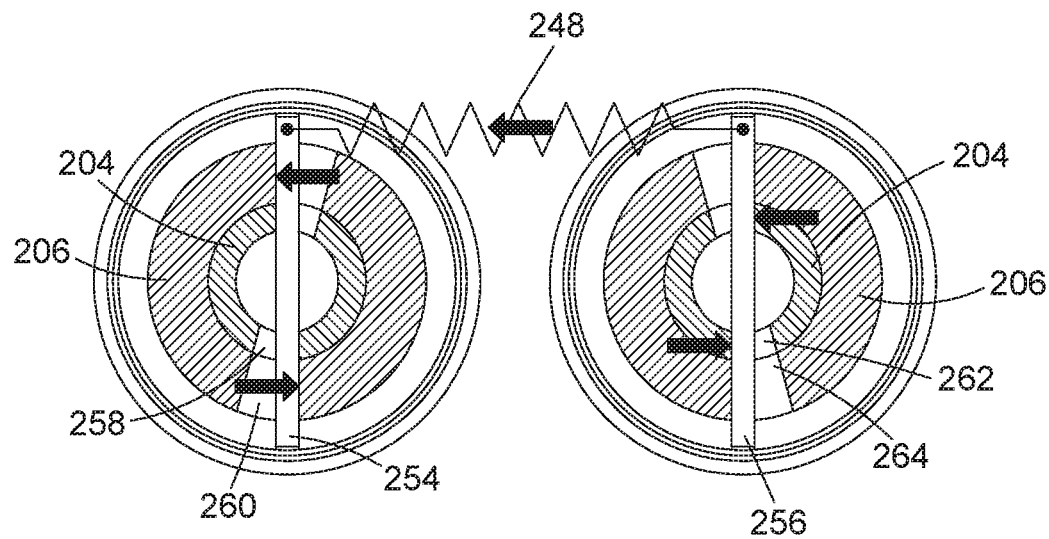
FIGS. 7A and 7B are schematic representations of the torsional coupling of FIGS. 5 and 6 illustrating the activation of the jammer shown in FIG. 4.

In operation, the motor output shaft 218 of the electric motor 220 may rotate in either a clockwise or anticlockwise direction, depending on the required direction of rotation of the actuator transmission shaft 222. FIG. 7A illustrates how torque is transmitted between the input and output shafts 204, 206 of the torque limiter 200 when the motor shaft 218 is rotating in an anticlockwise direction.

In this mode of operation, the anticlockwise facing surfaces of the second openings 262, 264 in the input shaft 204 transmit torque to the first coupling pin 254. This torque is then transmitted into the second end 252 of the torsion spring 248, through the torsion spring 248, into the first end 250 of the torsion spring 248, and from there into the first coupling pin 254. The first coupling pin 254 then transmits the torque to the clockwise facing surfaces of the first openings 258, 260 in the first end 244 of the output shaft 206, thereby causing the actuator transmission shaft 222 to rotate and provide torque to one or more actuators downstream from the torque limiter 200. Through this arrangement, the output shaft 206 will rotate at the same speed as the input shaft 204, such that there is no relative rotation between the two shafts, when the torque is below the preset torsional load of the torsion spring 248.

Figure 8A:
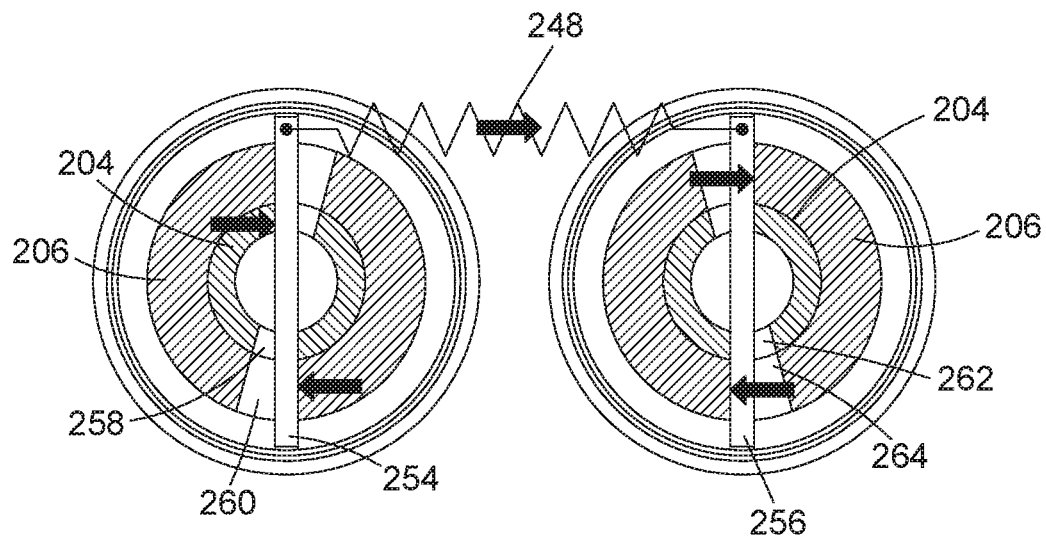
FIGS. 8A and 8B are further schematic representations of the torsional coupling of FIGS. 5 and 6 illustrating the activation of the jammer shown in FIG. 4.

FIG. 8A illustrates another example of how torque can be transmitted between the input and output shafts 204, 206 of the torque limiter 200.

In this mode of operation, the clockwise facing surfaces of the first openings 258, 260 in the first end 244 of the input shaft 204 transmits torque to the first coupling pin 254. This torque is then transmitted into the first end 250 of the torsion spring 248, through the torsion spring 248, into the second end 252 of the torsion spring 248, and from there into the second coupling pin 256. The second coupling pin 256 then transmits the torque to the anticlockwise facing surfaces of the second openings 262, 264 in the second end 246 of the output shaft 206, thereby causing the output shaft 206 to rotate to provide torque to an actuator downstream from the torque limiter 200. Again, the output shaft 206 will rotate at the same speed as the input shaft 204, such that there is no relative rotation between the two shafts, when the torque is below the preset torsional load of the torsion spring 248.

Figure 7B:
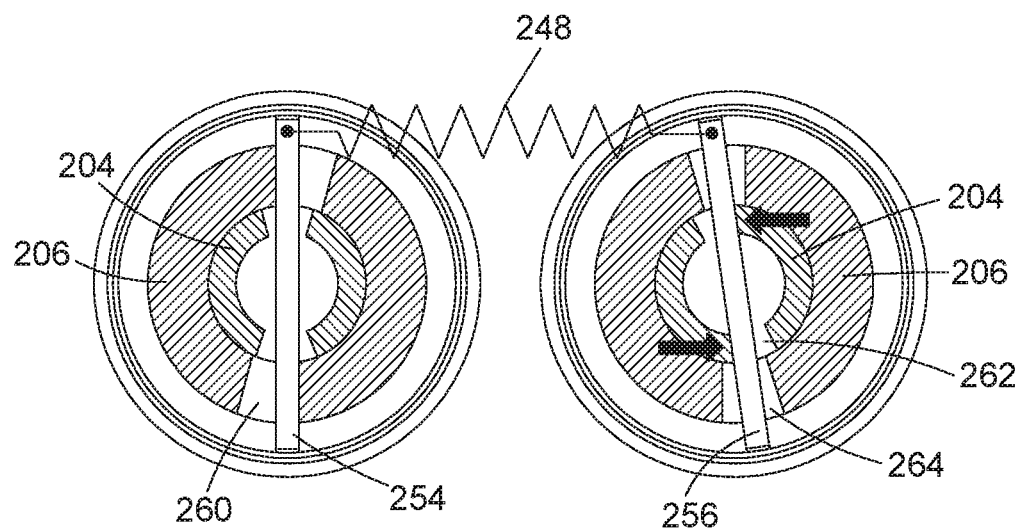
Figure 8B:
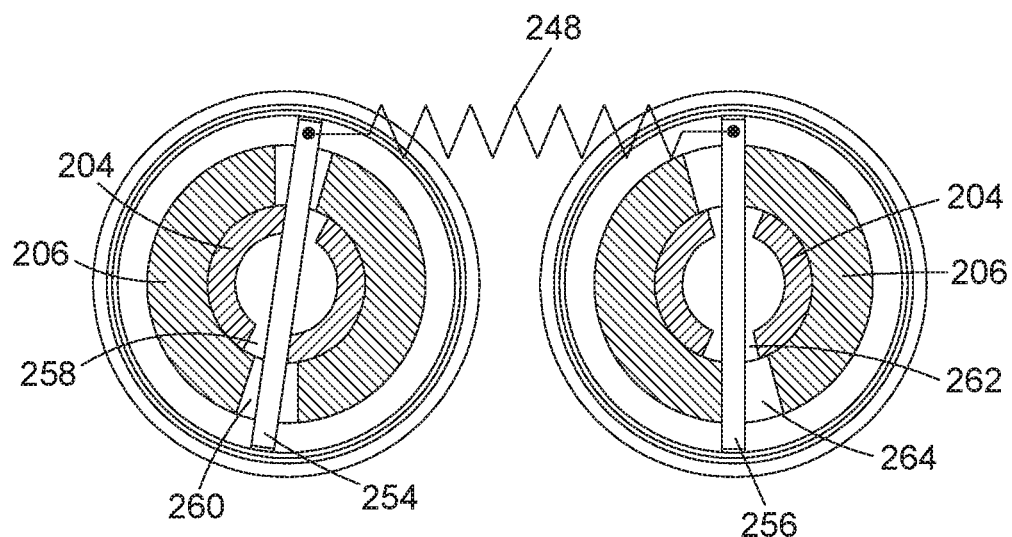

The preload of the torsion spring 248 is set at a level such that during normal operation, the torque transmitted through the torsion spring 248 does not exceed the preload. In effect, the preload sets a minimum torque limiter setting. As long as the torque remains at a level below the preload, the input and output shafts 204, 206 will rotate together at the same speed, with the torque from the motor being transmitted to the actuator. However, should, for example, the actuator jam (as might happen if a translating cowl, to which it is coupled, jams) then the output shaft 206 would cease to rotate, or at least rotate more slowly. This will result in the torsion spring's preload being exceeded. As illustrated schematically in FIGS. 7B and 8B, this will cause the ends of the torsion spring 248 to rotate, the first and second coupling pins 254, 256 moving relative to one another and permitting rotation of the input and output shafts 204, 206 relative to one another.

Once there is relative movement between the input and output shafts 204, 206, the rolling receiving surface 228 of the input shaft 204 will rotate relative to the projecting teeth 232 in the jamming mechanism 226 and the roller elements 230 will be forced along the ramps 240 on the roller receiving surface 228 of the input shaft 204 by the projecting teeth 232 of the output shaft 206, thereby forcing the roller elements 230 into wedged contact with the static ring 234 of the housing unit 202 and stopping the rotation of the input shaft 204. The torque is then, in effect, grounded by the static ring structure 234 and the structure anchoring the housing of the torque limiter 200, deflecting the torque into that grounded structure rather than being transmitted to a downstream actuator system. In this way, by grounding the torque to the static structure to which the torque limiter 200 is attached, damage to the actuator system can be avoided at the expense of potential damage to the upstream components.

Due to the symmetrical configuration of the ramps, the device will operate at the same degree of relative angular displacement irrespective of the direction of rotation of the input shaft 204.

The aim of the torque limiter 200 is to operate as quickly as possible after a fault occurs to avoid high torque loads leaking into the downstream components and damaging them. The torque value at which the torque limiter 200 will operate is determined by the torsional spring rate of the torsion spring 248 and the degree of preload.

In the embodiment described above, the jamming mechanism 226 is activated with about 5° of relative rotational movement of the input and output shafts 204, 206. However, the position of activation may be chosen to be a different value.

As discussed above, the torque limiter 200 is positioned proximate to the output of the electric motor. By positioning the torque limiter 200 as close to the electric motor output as possible, potential damage to drive/transmission shafts, actuators and other systems downstream from the torque limiter 200 can be minimised if a jam or other event occurs that prevents actuation of the actuation system.

It will be appreciated that if the torque limiter 200 is embodied in a system as illustrated in FIG. 1 where a number of actuators are connected in series, as soon as the torque limiter 200 operates, it will stop the rotation of the entire transmission system as the drive shaft 222 will cease to rotate. In a TRAS, having multiple actuators for a translating cowl, the torque limiter will ground adverse torsional loads before it can harm the actuators 104, 108 and the connecting flexible transmission shafts 110. Furthermore, by locating the torque limiter 200 ahead of the first flexible drive shaft 106, it means that damage to this component can be avoided too.

A downside of grounding the torque in this way is that the jamming or power loss event may result in the torque loads experienced by the motor 102 exceeding its maximum load and damage may result, for example, the motor output shaft may shear. The motor 102 may be considered as a sacrificial component in the TRAS 200 as a result. However, the replacement of the motor 102 or a motor output shaft in the event that there was a jam or power loss may be an easier operation than replacing additional downstream components.

The motor output shaft 218 may be adapted to promote a fracture in the event that excessive torsional forces are experienced. For example, the motor output shaft 218 may be configured to shear under high torsional loads. The motor output shaft 218 may comprise a quill shaft so that that portion of the motor output shaft 218 can be replaced easily without having to replace the remainder of the motor 102.

Thus when a jam or other event prevents the actuators from actuating, causing relative rotation between the output shaft 206 and the input shaft 204 of the torque limiter 200 and causing the jammer 226 to engage, the motor output shaft 218 will be placed under a torsional load from the continued operation of the electric motor 220. If the torsional load reaches a certain threshold, the motor output shaft, or a portion of it, will shear to prevent damage to systems downstream from the torque limiter 200. Torque loads are instead guided from the input shaft 204 to the static ring 234 and housing unit 202 of the torque limiter 200 where they are grounded, as shown by the arrow. If the motor shaft 218 comprises a shear neck 224, as shown in FIG. 3, the shear neck 224 is configured to shear under high torsional loads before any other element of the motor may shear. This allows control of where damage in the system may occur to further isolate and localise that damage, minimising damage to surrounding or connected systems and components. The shear neck 224 may be provided as part of a quill shaft, i.e., a replaceable portion of the motor output shaft 218.

It will be appreciated that the embodiment described herein has a number of advantages. In view of the arrangement of the torsion spring 248 around the input and output shafts 204, 206, it provides a relatively compact construction, which is advantageous in restricted operating spaces, such as gas turbine engine cowls. Also, the desired degree of preload of the torsion spring 248 can be easily set.

The above description is of an exemplary embodiment only, and it will be clear that modifications may be made to the embodiment without departing from the scope of the disclosure.

The invention claimed is:

1. A gas turbine engine of an aircraft comprising:
   a thrust reverser actuation system (TRAS) configured to move a translating cowl for redirecting at least a portion of an airflow of the gas turbine engine in an opposite direction to that of the aircraft, the TRAS comprising:
   an electric motor having a motor output shaft;
   a first actuator; and
   a transmission system linking the electric motor to the first actuator, the transmission system comprising:
      a drive shaft having an input end and an output end, the output end connected to an input of the first actuator; and
      a torque limiter wherein the torque limiter comprises:
      an input shaft coupled to the electric motor;
      an output shaft;
      a torsion spring, wherein the torsion spring has a first end coupled to the input shaft and a second end coupled to the output shaft, and wherein the torsion spring is torsionally preloaded; and
      a jammer coupled to the input shaft and the output shaft, wherein the jammer is configured to stop rotation of the input shaft and ground torque in response to relative rotation between the input shaft and the drive shaft,
   wherein the torque limiter is positioned at an upstream end of the transmission system and connects the motor output shaft of the electric motor to an input end of the drive shaft;
   wherein the TRAS comprises additional actuators that are linked to the first actuator by transmission shafts connecting the first actuator to the additional actuators to deliver torque to each of the additional actuators.

2. A gas turbine engine as claimed in claim 1, wherein the drive shaft comprises a flexible drive shaft and/or the output end of the drive shaft connects to a gearhead at the input of the first actuator.

3. A gas turbine engine as claimed in claim 2, wherein the flexible drive shaft comprises a series of apertures or slots to permit lateral flexion.

4. A gas turbine engine as claimed in claim 1, wherein the additional actuators are configured to be driven by the electric motor through flexible first and second transmission shafts connecting the first actuator to first and second gearheads respectively of the additional actuators.

5. A gas turbine engine as claimed in claim 1, wherein the ratio of a minimum torque limiter setting, determined by the torsion spring preload, and a torque required to drive the TRAS is at least 11:10.

6. A gas turbine engine as claimed in claim 1, wherein the input shaft and the output shaft of the torque limiter are concentrically coupled for torque transmission within the jammer, wherein optionally the input shaft of the torque limiter has a portion that extends axially parallel to and radially inwards of a portion of the output shaft, the portion of the output shaft comprising a plurality of teeth separating a plurality of roller elements within the jammer.

7. A gas turbine engine as claimed in claim 1, wherein the torque limiter further comprises coupling pins extending radially through openings in the input shaft and the output shaft, the coupling pins connected to the torsion spring, optionally wherein the openings extend in a radial direction when viewed in lateral cross-section, the openings increasing in width in a circumferential direction as they extend in the radial direction.

8. A gas turbine engine as claimed in claim 1, wherein the input shaft of the torque limiter is synchronous with the output shaft during normal use when operating levels of torque are below a torsional preload of the torque limiter.

9. A gas turbine engine as claimed in claim 1, wherein the electric motor output shaft comprises a quill shaft.

10. A gas turbine engine as claimed in claim 1, wherein the electric motor outer shaft comprises a shear neck.

11. A method of limiting torque in the gas turbine engine of claim 1, the method comprising:
    driving the first actuator using the electric motor;
    limiting a torque load from being transferred from the electric motor to the first actuator using the torque limiter, during a failure event, wherein the torque load is limited by the torque limiter at the motor output shaft of the electric motor where torque is being coupled from the motor output shaft to an upstream end of a transmission system that is arranged to deliver torque to the first actuator.

12. A method of limiting torque as claimed in claim 11, wherein the torque load is grounded by the torque limiter, during a failure event, into a static structure of the aircraft.

* * * * *